Aug. 26, 1969  E. A. ROLLOR, JR  3,463,140
CONTAINER FOR HEATED LIQUIDS
Filed Oct. 11, 1967

INVENTOR
EDWARD A. ROLLOR
BY Newton, Hopkins,
Jones & Ormsby
ATTORNEYS

United States Patent Office 3,463,140
Patented Aug. 26, 1969

3,463,140
CONTAINER FOR HEATED LIQUIDS
Edward A. Rollor, Jr., 658 Wisteria Drive,
Marietta, Ga. 30060
Filed Oct. 11, 1967, Ser. No. 674,597
Int. Cl. A47g 23/04; F24h 7/00; F25d 3/08
U.S. Cl. 126—246        5 Claims

ABSTRACT OF THE DISCLOSURE

A container for heated liquids comprising an outer cup-shaped shell and an inner cup-shaped shell received in the outer shell. The inner shell is double walled and its walls define an annulus. Corrugated metal foil is inserted in, and extends about the annulus, and paraffin, or similar material which is fusable at a relatively low temperature, is positioned between the folds of the corrugated metal foil. When a hot liquid is poured into the container, the heat from the liquid is transmitted by the metal foil to and stored in the paraffin as the paraffin fuses at a temperature which is approximately the optimum temperature for drinking hot liquids. As the liquid and cup cools, the paraffin will begin to solidify as the liquid passes through the optimum temperature, thereby giving up the heat previously absorbed and tending to maintain the liquid at the optimum drinking temperature.

Background of the invention

When hot liquids are served for human consumption, such as coffee, soup, etc., the liquids are usually served at a temperature above the optimum temperature suitable for consumption. The person who is to consume the liquid must wait for it to cool, and if the liquid is served too early, or if the person inadvertently waits too long for the liquid to cool, the liquid will pass through that temperature range which is the optimum for human consumption. It has been found that the perferred temperature for a cup of hot coffee is some temperature between 130° F. and 150° F., the exact temperature depending on the individual taste. The most popular temperature is probably about 140° F. The optimum temperature range is a range of about ±3° F. about the preferred temperature. When a cup of coffee is served at a temperature well above the optimum range of temperature and left to cool, its temperature will pass through the optimum range of temperatures in a time lapse of approximately two minutes, under normal circumstances, depending upon the type container utilized and other variables. Thus, the person drinking a cup of coffee has only approximately two minutes in which to consume the coffee while it is in its optimum temperature range.

While various electrical appliances have been developed to maintain coffee, soup and other liquids at a proper temperature for serving, no successful inexpensive method has been found for maintaining a liquid within the optimum temperature range for consumption for a prolonged period of time.

Summary of the invention

This invention comprises a container for heated liquids which rapidly cools the heated liquid to the optimum range of temperatures for human consumption and maintains the liquid within the optimum range of temperatures for a prolonged period of time, and includes an outer cup element, and an inner cup element received in and spaced from the outer cup element. The inner cup element defines an annulus in its wall portion. Corrugated metal foil extends about the annulus, and paraffin or material having similar properties is dispersed throughout the annulus, between the folds of the metal foil.

Thus, it is an object of this invention to provide a container for maintaining heated liquids within a predetermined temperature range for a prolonged period of time.

Another object of this invention is to provide a container for rapidly cooling heated liquids to a range of temperatures suitable for human consumption, and holding the temperature of the liquids within the range of temperatures for a prolonged period of time.

It is another object of this invention to provide a container for heated liquids, which will absorb heat from the liquid, and when the liquid begins to cool, it will return the heat to the liquid.

Other objects, features and advantages of the present invention will become apparent upon reading the following specification, when taken in conjunction with the accompanying drawing.

Description of the embodiment

Figure 1:
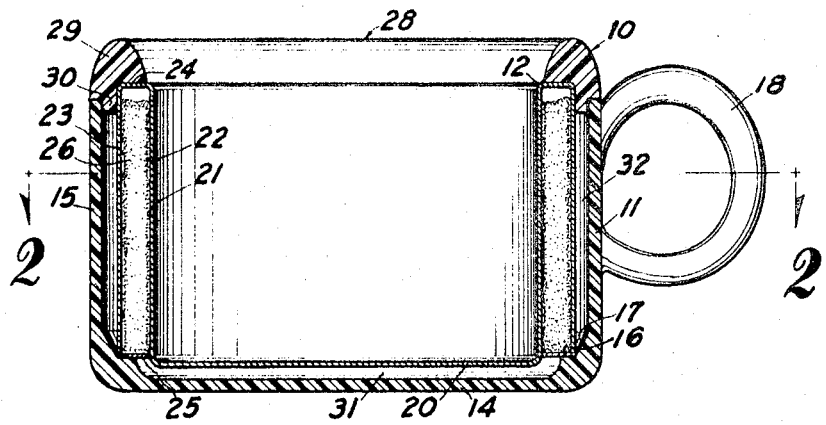
FIGURE 1 is a cross-sectional view, in elevation of the container for heated liquids.

Referring now more particularly to the drawing in which like numerals indicate like parts throughout the several views, FIGURE 1 shows a container or cup 10 having an outer shell or cup element 11 and an inner shell or cup element 12. Outer shell 11 is generally cup-shaped and includes a disc-shaped bottom wall 14 joined at its periphery to annular upstanding side wall 15. An annular ledge 16 is formed at the juncture of bottom wall 14 and side wall 15, and an inwardly tapered web 17 extends between ledge 16 and side wall 15. Ledge 16 is spaced upwardly from bottom wall 14. Handle 18 is connected to the exterior surface of the side wall 15 of outer shell 11.

Inner shell 12 includes a disc-shaped bottom wall 20 which is joined at its periphery to upstanding wall 21 which is of double thickness, and includes inner wall portion 22, outer wall portion 23, upper rim 24, and lower rim 25. Thus, wall portions 22 and 23 and rims 24 and 25 define annulus 26.

Lip or external rim 28 extends about the upper edges of inner and outer shells 11 and 12. The upper portion 29 of lip 28 is tapered so as to form a surface which is comfortable to the feel of the mouth when the cup is used for drinking purposes, and the lower portion of lip 28 includes flange 30 which is constructed to be inserted between outer and inner shells 11 and 12. Flange 30 is offset from the outer diameter of lip 28 a distance corresponding to the thickness of wall 15 of outer shell 11 so that a smooth junction is created between wall 15 and lip 28. When inner shell 12 is inserted into outer shell 11, lower rim 25 of inner shell 12 will rest upon ledge 16 of outer shell 11 to maintain the shells in vertical spaced relationship, and so that space 31 is defined between bottom walls 14 and 20 of outer and inner shells 11 and 12 respectively. Tapered web 17 of outer shell 11 maintains outer wall portion 23 of inner shell 12 spaced from wall 15 of outer shell 11, thereby forming an annular space 32 between outer and inner shells 11 and 12. When lip 28 is inserted over shells 11 and 12 by inserting flange 30 into space 32, flange 30 maintains outer and inner shells 11 and 12 rigidly connected together and in spaced relationship at their upper portions.

Figure 2:
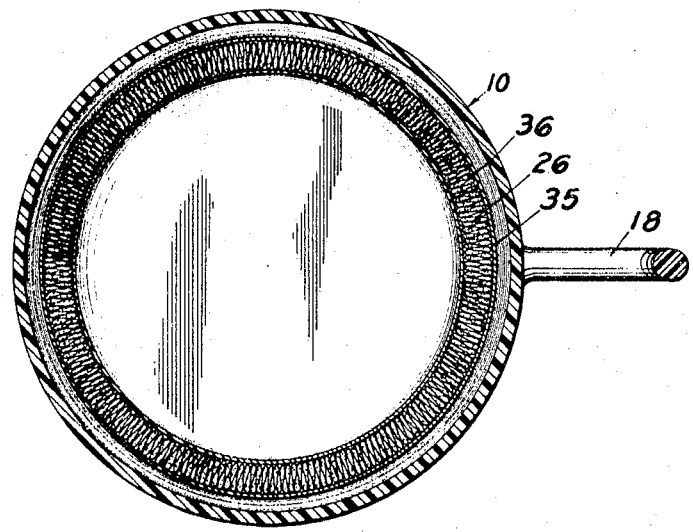
FIGURE 2 is a cross-sectional view of the container, taken along lines 2—2 of FIGURE 1.

As is shown in FIGURE 2, annulus 26 of inner shell 12 is filled with corrugated metal foil 35 and a material 36, such as paraffin, which is fusible at a prescribed temperature in the range between 100° F. and 200° F.; preferably between 130° F. and 150° F. When inner shell 12 is originally fabricated, it is formed with only bottom wall 20, inner wall portion 22, upper rim 24, and outer wall portion 23, thereby leaving annulus 26 open at its lower end. Metal foil 35 is folded to form a corrugated surface so that the width of the folds are slightly longer than the distance between inner wall portions 22 and outer wall portion 23 of the annulus of inner shell 12. After the metal foil has been folded, it is inserted into annulus 26 and compressed circumferentially about annulus 26 to bias the edges of its folds into positive contact with inner and outer wall portions 22 and 23. As is shown in FIGURE 2, pockets will be formed between the folds of metal foil 35. Paraffin or similar material is inserted in the pockets between the folds of metal foil 35. After the paraffin has been properly inserted in the folds, lower rim 25 is positioned over the opening of annulus 26 and sealed, by soldering or similar procedures. Annulus 26 is left partially unfilled so that space is provided for expansion of the material confined therein.

The surface of inner wall portion 22 facing annulus 26 can be pre-tinned with a high temperature solder and when the corrugated metal foil 35 is positioned in annulus 26, inner shell 12 is heated, preferably in an oven with an inert gas atmosphere, and brought to the necessary temperature for good bonding between the edges of the corrugated metal foil 35 and the surface of inner wall portion 22 facing annulus 26. The bonding of metal foil 35 to inner wall portion 22 assures good heat transfer between the elements.

The material utilized between the folds of metal foil 35 should be fusible at a temperature in the range between 100° F. and 200° F., depending upon the optimum temperature at which the liquid should be consumed. If the container is to be utilized as a cup for coffee consumption, the material should fuse at a temperature in the range from about 130° F. to about 150° F. The material should also be non-toxic since it is possible, under extreme circumstances, that it might be ingested. If possible, the material should also have high thermal conductivity characteristics, so that the heat can be readily transferred to and from the liquid in the container; however, the presence of corrugated metal foil 35 in annulus 26 aids the transfer of heat to and from the material, so that a material having relatively low heat exchange characteristics can be utilized. When a material having low heat exchange characteristics is utilized, more corrugated metal foil 35 can be inserted in annulus 6, thereby reducing the size of the pockets formed between the folds of the metal foil, which increases the amount of heat transfer material in annulus 26, thus assuring proper heat transfer. Thus, paraffin and beeswax, which fuse in optimum temperature range and which meet the other requirements, have been successfully utilized as the heat storing material. Paraffin is a mixture of hydrocarbons with different melting points. Paraffins are available with a narrow melting point range centered on almost any desired temperature in the 130° F. to 150° F. range.

The presence of space 31 between the bottom of outer and inner shells 11 and 12, and space 32 between the side walls 15 and 23 of outer and inner shells 11 and 12 prevents the heat of the liquid from being transferred from bottom wall 20 of inner shell 12 through bottom wall 14 of outer shell 11, and from annulus 26 through side wall 15 of outer shell 11. Thus, inner shell 12 functions to initially conduct heat away from the heated liquid and subsequently restore the heat in the liquid, while spaces 31 and 32 between outer and inner shells 11 and 12 function to prevent the stored heat and the heat of the liquid from being dissipated through the walls of the container.

While paraffin has been found to be highly successful as the fusible material for annulus 26, it is anticipated that various other and different materials, and mixtures thereof might be utilized in a similar manner. Furthermore, the speed at which the heat is transferred to and from the material can be varied by utilizing more or less metal foil. For instance, when a large amount of metal foil is utilized, the heat is transferred at a faster rate and more of the heat energy which would have been lost to the air by convection can be used to melt the fusible material. This allows the use of more fusible material, which extends the time duration. The temperature of the liquid drops rapidly to a narrow temperature range and stays within this range for a long time period. If a smaller amount of metal foil is used, the heat transfer process will be slower and more heat will be lost to the air and not be available to melt fusible material. Thus, the amounts of heat transfer material and fusible material and combinations thereof can be selected so as to make the container have certain temperature versus time characteristics.

While the invention has been disclosed as utilizing corrugated metal foil as the heat conducting material to transfer the heat to the paraffin, which has been found to be both effective and inexpensive, various other arrangements might be utilized to accomplish substantially the same heat transfer function. For instance, mill scale, copper wool, or various other metal fragments might be intermingled with the paraffin or bonded to inner wall portion 22 of inner shell 12 so as to create hot spots throughout the body of the paraffin and annulus 26. Furthermore, the surfaces of inner wall portion 22 and outer wall portion 23 of inner shell 12 can be fabricated with radiating ribs to aid in the heat transfer function.

While the invention has been fabricated with its outer shell 11 and lip 28 of plastic and inner shell 12 of stainless steel, it is anticipated that various other and different materials might be utilized. For instance, the entire cup can be fabricated of metal or plastic, the outer shell can be fabricated of wood, and the inner shell can be fabricated of aluminum. Generally speaking, however, the surface of inner shell 12 which comes into direct contact with the liquid to be consumed from the container should be fabricated of a substance having high thermal conductivity to aid in transferring heat to and from the paraffin while the remaining portions of the container should be fabricated of materials having lower thermal conductivity characteristics, so as to assist in the heat insulating and storing function of the container.

At this point, it should be apparent that the container provides an inexpensive device for initially cooling a heated liquid to a temperature range suitable for human consumption, and subsequently maintaining the liquid within the desired temperature range for a prolonged period of time. Furthermore, it will be obvious to those skilled in the art that many variations may be made in the embodiments chosen for the purpose of illustrating the present invention without departing from the scope thereof as defined in the appended claims.

I claim:

1. A container for fluids comprising an outer shell including a bottom wall and an annular upstanding side wall, an inner shell positioned inside the outer shell and including a bottom wall and a double walled annular side wall, the double walled annular side wall forming a hollow annulus and being at least partially filled with a material which is fusible between 130° F. and 150° F., corrugated metal foil being positioned in said annulus with its folds extending generally in an upwardly direction and being bonded at alternate creases to the inner wall portion of said shell, said metal foil being immersed in said fusible material.

2. The invention of claim 1 wherein a major portion of the exterior surface of the inner shell is maintained in spaced relationship from the outer shell.

3. The invention of claim 1 wherein said material includes paraffin.

4. The invention of claim 1 wherein the bottom wall of the inner shell is spaced from the bottom wall of the outer shell and the outer wall portion of the side wall of the inner shell is spaced from the side wall of the outer shell over a major portion of its surface.

5. A drinking cup of the type utilized when drinking hot beverages comprising an outer cup element defining an annular platform spaced inwardly from its bottom wall and side wall surfaces, an inner cup element resting on said platform in spaced relationship from the bottom wall and side wall surfaces of the outer cup element, said inner cup element defining an annulus within its side wall, corrugated metal foil being positioned in said annulus with the creases of its folds extending generally in an upward direction and with its creases in contact with the side wall of said inner cup, and paraffin dispersed throughout said annulus and between the folds of the metal foil.

References Cited

UNITED STATES PATENTS

| | | | |
|---|---|---|---|
| 907,099 | 12/1908 | Trowbridge | 62—457 X |
| 2,876,634 | 3/1959 | Zimmerman et al. | 62—457 |
| 2,893,704 | 7/1959 | Passman | 165—80 |
| 2,926,508 | 3/1960 | Moon | 62—457 |
| 3,148,676 | 9/1964 | Truog et al. | 126—246 |

FOREIGN PATENTS 808,690  2/1959  Great Britain.

ROBERT A. O'LEARY, Primary Examiner

ALBERT W. DAVIS, Assistant Examiner

U.S. Cl. X.R.

62—457; 126—400; 165—185